2 Sheets—Sheet 1.

B. G. DEVOE & G. R. MEASE.
CONVERTIBLE REVOLVING HARROW.

No. 171,217. Patented Dec. 21, 1875.

Witnesses,
Henri Guillaume
Chas Jacobsen

Inventors.
George R. Mease
Benjamin G. Devoe
Jno Henry Orth
atty.

N. PETERS, PHOTO-LITHOGRAPHER, WASHINGTON, D. C.

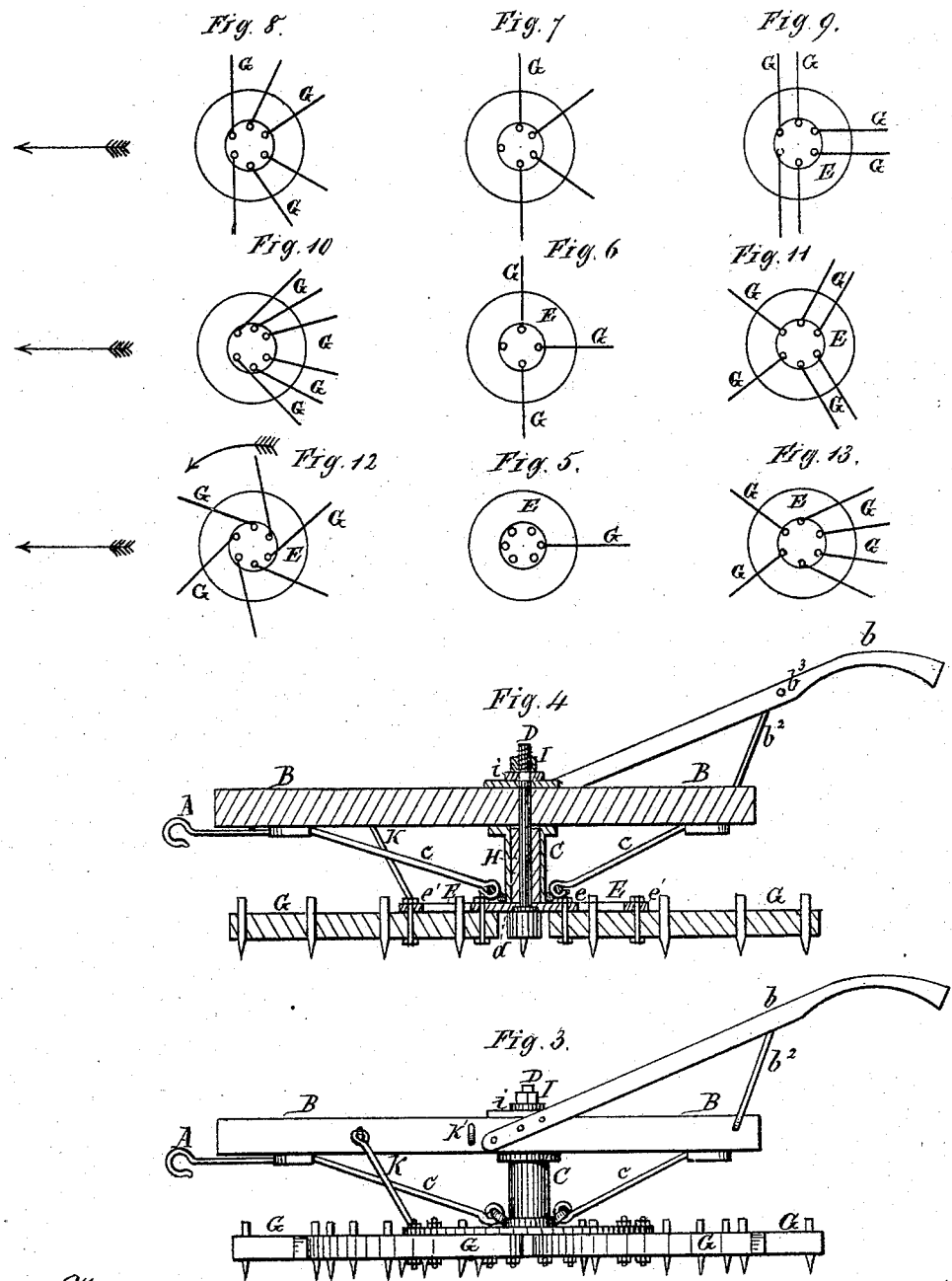

UNITED STATES PATENT OFFICE.

BENJAMIN G. DEVOE, OF KENTON, AND GEORGE R. MEASE, OF UPPER SANDUSKY, OHIO.

IMPROVEMENT IN CONVERTIBLE REVOLVING HARROWS.

Specification forming part of Letters Patent No. 171,217, dated December 21, 1875; application filed October 26, 1875.

*To all whom it may concern:*

Be it known that we, BENJAMIN GREEN DEVOE, of Kenton, in the county of Hardin, and GEORGE R. MEASE, of Upper Sandusky, in the county of Wyandot and State of Ohio, have invented certain new and useful Improvements in Convertible Harrows, of which the following is a specification:

Our invention relates to that class of agricultural implements which, by the peculiarity of their construction, are convertible into two or more implements for use in different agricultural operations; and consists, first, in the employment of a horizontal disk, to which are pivoted a series of radial arms in such a manner that said arms may be adjusted to any desired position around the circumference of said disk; secondly, to means whereby the implement or apparatus may be used either as a revolving or fixed apparatus; thirdly, in the construction of the disk and arms so that the latter may be removed and others substituted, or the arms are so constructed as to receive various devices for cultivation; and, lastly, to minor details of construction; but that our invention may be fully understood we will proceed to describe the same in detail, by aid of the accompanying drawings, in which—

Figure 1:
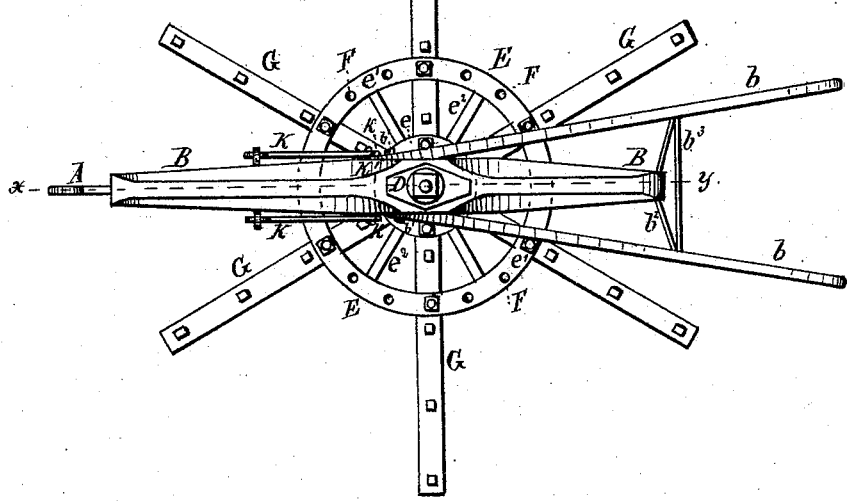
Figure 2:
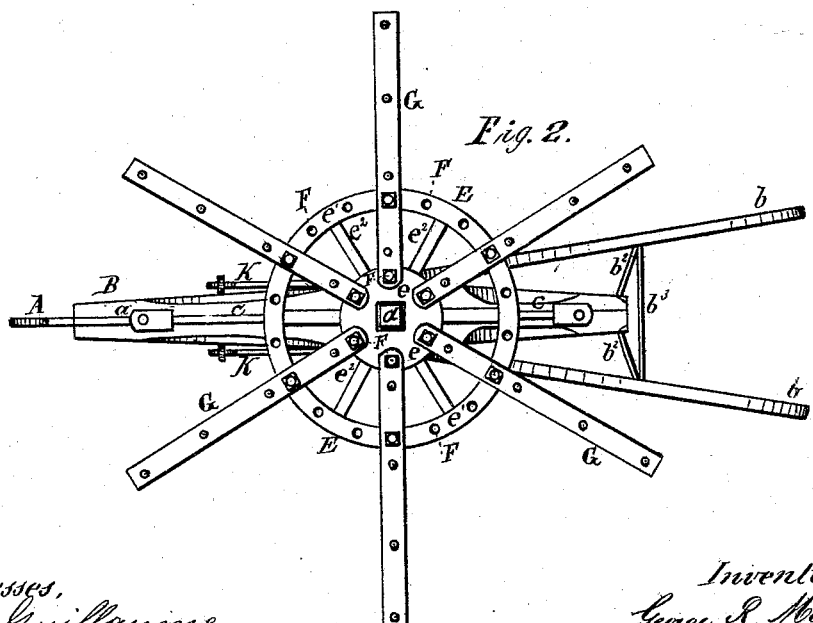

Figures 1 and 2 are top and bottom plan views, respectively; Fig. 3, a side elevation; and Fig. 4, a section through lines $xy$ of Fig. 3 of an apparatus constructed according to our invention.

Similar letters of reference are employed in all the figures to indicate corresponding parts wherever they may occur.

A is the draft-bar, secured to the pole or beam B at $a$ by any convenient or preferred means. To the pole B are affixed the handles $b$ by means of bolts $b^1$, or other suitable means, and braces $b^2$, the handles being further secured by the rods $b^3$. The pole or beam B is provided on its under side, near about the middle thereof, with a vertical pendent socket or sleeve, C, held rigidly and securely in position by means of the brace-rods $c$, as shown by Figs. 3 and 4. Said rods also serve to hold the pole B in a horizontal position, and prevent the same from swinging up and down, a suitable passage or hole, $c'$, being made in the beam B for the reception and passage of the vertical axle D of the disk or horizontal wheel. E is the horizontal disk or wheel, which may be made full or of one solid piece, or it may be constructed of two or more concentric rings, $e$ $e^1$, connected to each other by a series of arms or spokes, $e^2$. The latter construction is preferred, as the disk E may thus be made much lighter than it would be if made in one solid piece. The inner and outer rings and disk $e$ $e^1$ are provided with a series of perforations or bolt-holes, F, equidistant from each other. To the inner disk $e^1$ a series of arms or beams, G, are pivoted around a common circle—that is to say, all the arms have their pivotal axes on one and the same circle, and when placed in the desired position are rigidly secured by means of bolts and nuts, said bolts passing through the holes F in the ring $e^1$, and through the arms G. It is evident that by this arrangement and construction the arms may be set to any tangent to the pivotal circle, and thus assume various positions, some of which we have illustrated by the diagrams Figs. 5, 6, 7, 8, &c., and when in any of these positions may be rigidly secured by means of the bolts passing through said arms and the holes F formed in the circle or disk $e^1$. The disk E has formed on its upper side a hub, H, which enters into and revolves within the vertical socket C affixed to the pole or beam B, the two being connected together by an axle, D. The upper part of said axle D has a screw-thread formed thereon to receive a nut, I, and immediately below this threaded part the axle D is formed square, as shown by Fig. 4, for the reception of the washer $i$, which is provided with a square hole to fit on the squared portion of the axle D. The lower end of the vertical axle D is provided with a square head, $d$, which, when the parts are in position, fits into and rests in a recess of the same configuration formed in the under face of the disk or wheel E. By these means, when the apparatus is used as a revolving harrow, the axle D, arms G, disk E, and hub H are caused to revolve together with the washer $i$ and nut I, thus preventing said nut and washer to turn by frictional contact with the beam or pole B in an opposite direction, and thereby unscrew the nut I. When it is desired to use the implement as an ordinary or drag harrow, or as a plow or cultivator, the disk E, and consequently the arms G, are prevented from revolving by means of the links or rods K, connected by a toggle-joint, one to each side of the pole or beam B, said links K having a hook, $k$, formed on their other extremity or free end for the purpose of hooking them to the disk E, the hooks being inserted into the perforations in the ring $e^1$, on either side of the beam or pole B, and thus prevent said disk and the arms G from revolving.

When the implement is used as a revolving harrow the links K are held up out of the way in the loops or hooks $k'$, affixed to each side of the beam or pole B for that purpose.

We have shown in the drawings an apparatus provided with six radial arms, G, but it will be understood that more or a less number may be employed, as desired, and when the implement is used as a plow or harrow all those arms that are not needed are removed by simply withdrawing the pivotal pins and screw-bolts in the disk and ring $e\ e^1$.

The radial arms G may be constructed in such a manner as to receive shovel or other plows in lieu of the harrow-teeth when the apparatus is to be used as a cultivator, and by the peculiar manner of connecting said arms with the disk they may be readily adjusted to suit the different widths of the rows of the growing crop to be cultivated, or separate and interchangeable radial arms may be employed, if desired.

The apparatus is constructed of any suitable or preferred material.

Having now described our invention, what we claim, and desire to secure by Letters Patent, is—

1. In a revolving harrow, the disk or rim E, constructed substantially as described, in combination with a series of removable and adjustable radial arms or beams pivoted thereto and secured in position in the manner and for the purposes specified.

2. The pole B and links K, in combination with the disk or rim E, substantially as and for the purposes specified.

3. The combination of the disk or rim E, having a recess formed in its lower face for the purposes described, the hub H and axle D, constructed as set forth, with the pole or beam D, pendent socket or sleeve C, and the brace-rods $c$, when constructed to operate as described.

In witness that we claim the foregoing we have hereunto set our hands this 21st day of September, 1875.

BENJAMIN GREEN DEVOE.
GEORGE RHINEHEART MEASE.

Witnesses:
W. D. HARE,
WM. C. KING.